(12) United States Patent
Maehara et al.

(10) Patent No.: US 10,195,908 B2
(45) Date of Patent: Feb. 5, 2019

(54) PNEUMATIC TIRE

(71) Applicant: SUMITOMO RUBBER INDUSTRIES, LTD., Kobe-shi, Hyogo (JP)

(72) Inventors: Atsushi Maehara, Kobe (JP); Kae Matsuda, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 105 days.

(21) Appl. No.: 15/021,347

(22) PCT Filed: Sep. 24, 2014

(86) PCT No.: PCT/JP2014/075280
§ 371 (c)(1),
(2) Date: Mar. 11, 2016

(87) PCT Pub. No.: WO2015/050022
PCT Pub. Date: Apr. 9, 2015

(65) Prior Publication Data
US 2016/0221397 A1  Aug. 4, 2016

(30) Foreign Application Priority Data

Oct. 4, 2013  (JP) ................................. 2013-209463
Dec. 16, 2013 (JP) ................................. 2013-259426

(51) Int. Cl.
B60C 11/03 (2006.01)
B60C 11/13 (2006.01)

(52) U.S. Cl.
CPC ........ B60C 11/033 (2013.01); B60C 11/0302 (2013.01); B60C 11/0306 (2013.01);
(Continued)

(58) Field of Classification Search
CPC ................... B60C 11/033; B60C 11/0302; B60C 11/0309
See application file for complete search history.

(56) References Cited

U.S. PATENT DOCUMENTS 6,607,018 B1 * 8/2003 Fukunaga ........... B60C 11/0304
152/209.8
2006/0137791 A1 * 6/2006 Miyabe ............... B60C 11/0302
152/209.18
(Continued)

FOREIGN PATENT DOCUMENTS

EP  1026012 A2 * 8/2000 ......... B60C 11/0316
EP  1026012 A2 * 8/2000 ......... B60C 11/0316
(Continued)

OTHER PUBLICATIONS

Extended European Search Report, dated May 3, 2017, for European Application No. 14850473.1.
(Continued)

Primary Examiner — Jacob T Minskey
Assistant Examiner — Melody Tsui
(74) Attorney, Agent, or Firm — Birch, Stewart, Kolasch & Birch, LLP

(57) ABSTRACT

A pneumatic tire 1 is provided in a tread portion 2 with center blocks 22 divided by a center main groove 10, middle main grooves 11, and center lateral grooves 21; middle blocks 32 divided by the middle main grooves 11, shoulder main grooves 12, and middle lateral grooves 31; and shoulder blocks 42 divided by the shoulder main grooves 12, tread edges Te, and shoulder lateral grooves 41. The groove width WA of the center lateral grooves 21 is equal to the groove width WB of the middle lateral grooves 31. The ratio WC/WA of the groove width WC of the shoulder lateral grooves 41 and the groove width WA of the center lateral grooves 21 is 1.3 to 2.3.

14 Claims, 10 Drawing Sheets

(52) U.S. Cl.
CPC ...... *B60C 11/0309* (2013.01); *B60C 11/1369* (2013.01); *B60C 2011/036* (2013.01); *B60C 2011/0334* (2013.01); *B60C 2011/0346* (2013.01); *B60C 2011/0353* (2013.01); *B60C 2011/0365* (2013.01); *B60C 2011/0372* (2013.01); *B60C 2200/06* (2013.01)

(56) References Cited

U.S. PATENT DOCUMENTS

| | | |
|---|---|---|
| 2007/0151643 A1 | 7/2007 | Takahashi |
| 2011/0226397 A1 | 9/2011 | Hamada |
| 2011/0259494 A1* | 10/2011 | Shibano .............. B60C 11/0306 152/209.22 |
| 2012/0132335 A1 | 5/2012 | Fujita |
| 2013/0248068 A1* | 9/2013 | Nakata ................ B60C 11/0306 152/209.18 |

FOREIGN PATENT DOCUMENTS

| | | |
|---|---|---|
| JP | 9-226326 A | 9/1997 |
| JP | 2001-018617 A | 1/2001 |
| JP | 2006-111091 A | 4/2006 |
| JP | 2011-189846 A | 9/2011 |
| JP | 2011-195045 A | 10/2011 |
| JP | 2011-230643 A | 11/2011 |
| JP | 2012-116245 A | 6/2012 |
| JP | 2014-125109 A | 7/2014 |

OTHER PUBLICATIONS

International Search Report (PCT/ISA/210) issued in PCT/JP2014/075280, dated Dec. 16, 2014.
Written Opinion (PCT/ISA/237) issued in PCT/JP2014/075280, dated Dec. 16, 2014.

* cited by examiner

PNEUMATIC TIRE

TECHNICAL FIELD

The present invention relates to a pneumatic tire improved in wet performance and wear resistance in good balance.

BACKGROUND ART

In recent years, due to the expansion of expressway networks, the percentage of driving on the expressway is increasing. In order to safely travel on an expressway in the rain, the tires are required to have high wet performance. On the other hand, in terms of economy, the tires are required to have high wear resistance.

In order to improve wet performance, there has been proposed a pneumatic tire which is provided in the tread portion with a plurality of blocks defined by a plurality of main grooves extending in the tire circumferential direction, and a plurality of lateral grooves extending in the tire axial direction. For example, in the following Patent Document 1 and Patent Document 2, there have been disclosed pneumatic tires provided with center blocks divided by center main grooves, middle main grooves and center lateral grooves; middle blocks divided by the middle main grooves, the shoulder main grooves and middle lateral grooves; and shoulder blocks divided by the shoulder main grooves, tread edges and shoulder lateral grooves.

PRIOR ART DOCUMENTS

Patent Documents

Patent Document 1: JP2011-195045
Patent Document 2: JP2011-230643

SUMMARY OF THE INVENTION

Problems to be Solved by the Invention

In the case of the pneumatic tires described in Patent Documents 1 and 2, for example, by increasing the groove volume by decreasing the land ratio of the tread portion, the drainage in the tread portion is increased, and the wet performance is improved. However, a small land ratio leads the tread portion to a reduced actual ground contact area and a reduced rubber volume, therefore, there is a possibility that the wear resistance is deteriorated.

Meanwhile, the heavy duty tires described in Patent Documents 1 and 2 have tread patterns for which a rotational direction is not specified, wherein
the axial length of a prior-contacting-side edge of one of a pair of center blocks arranged in the tire axial direction is shorter than the axial length of a prior-contacting-side edge of the other.

Consequently, in the vicinity of the prior-contacting-side edge of one of the blocks, the block rigidity becomes insufficient, and local slippage occurs when contacting with the ground, therefore, uneven wear is likely to occur.

Furthermore, at the prior-contacting-side edge of the above-mentioned one of the blocks, the angle formed between the middle main groove and the center lateral groove becomes an acute angle, therefore, water in the center lateral grooves is hard to be discharged to the middle main groove, and there is a possibility that the wet performance can not be fully improved.

The present invention was made in view of the circumstances as above, and a primary object is to provide a pneumatic tire improved in the wet performance and wear resistance in good balance.

Means for Solving the Problems

The present invention is a pneumatic tire provided in the tread portion with
a center main groove extending continuously in the tire circumferential direction,
a pair of middle main grooves extending continuously in the tire circumferential direction on both sides of the center main groove,
a pair of shoulder main grooves extending continuously in the tire circumferential direction between the middle main grooves and tread edges,
a plurality of center lateral grooves connecting between the center main groove and the middle main grooves,
a plurality of middle lateral grooves connecting between the middle main grooves and the shoulder main grooves,
a plurality of shoulder lateral grooves connecting between the shoulder main grooves and the tread edges, so as to have
a pair of center block rows of center blocks which are divided by the center main groove, the middle main grooves and the center lateral grooves, and arranged at intervals in the tire circumferential direction,
a pair of middle block rows of middle blocks which are divided by the middle main grooves, the shoulder main grooves and the middle lateral grooves, and arranged at intervals in the tire circumferential direction, and
a pair of shoulder block rows of shoulder blocks which are divided by the shoulder main grooves, the tread edges and the shoulder lateral grooves, and arranged at intervals in the tire circumferential direction,
and characterized in that
a groove width WA of the center lateral grooves is equal to a groove width WB of the middle lateral grooves, and
a ratio WC/WA of a groove width WC of the shoulder lateral grooves and the groove width WA of the center lateral grooves is 1.3 to 2.3.

In the pneumatic tire according to the present invention, it is preferable that the ratio WC/WA of
the groove width WC of the shoulder lateral grooves and
the groove width WA of the center lateral grooves is 1.6 to 2.0.

In the pneumatic tire according to the present invention, it is preferable that
the groove width WA of the center lateral grooves, the groove width WB of the middle lateral grooves, and the groove width WC of the shoulder lateral grooves are not less than 4 mm.

In the pneumatic tire according to the present invention, it is preferable that
a ratio Lc/Lm of
a land ratio Lc of a center region which is a region between tire-circumferential-direction lines passing through both ends in the tire axial direction of the center blocks and
a land ratio Lm of a middle area which is a region between tire-circumferential-direction lines passing through both ends in the tire axial direction of the middle blocks is 1.05 to 1.25.

In the pneumatic tire according to the present invention, it is preferable that
the angle with respect to the tire axial direction of the center lateral grooves is 10 degrees to 30 degrees.

In the pneumatic tire according to the present invention, it is preferable that a groove width of the shoulder main grooves is larger than a groove width of the center main groove, and a groove width of the middle main grooves is larger than a groove width of the shoulder main grooves.

In the pneumatic tire according to the present invention, it is preferable that the middle main grooves and the shoulder main grooves are formed zigzag, the middle main grooves are intersected by the center lateral grooves and the middle lateral grooves at zigzag vertexes of the middle main grooves, and the shoulder main grooves are intersected by the middle lateral grooves and the shoulder lateral grooves at zigzag vertexes of the shoulder main grooves.

In the pneumatic tire according to the present invention, it is preferable that the tread portion is provided with a directional pattern for which a rotational direction is specified.

In the pneumatic tire according to the present invention, it is preferable that the center lateral groove is inclined to a later-contacting-side in the rotational direction from the inner end in the tire axial direction toward the outer end, the middle main groove is zigzag such that short segments and long segments are alternately arranged, wherein the short segments are inclined to the same direction as the center lateral grooves, and the long segments are longer in the circumferential length than the short segments and are inclined to the opposite direction to the short segments, and the center lateral grooves are connected to the short segments of the middle main grooves.

In the pneumatic tire according to the present invention, it is preferable that the center lateral groove has a tie bar raising from the groove bottom and connecting between the adjacent center blocks.

In the pneumatic tire according to the present invention, it is preferable that the middle lateral grooves are inclined to the same direction as the center lateral grooves, the shoulder main groove has short segments inclined to the same direction as the middle lateral grooves, and long segments being longer in the circumferential length than the short segments and inclined to the opposite direction to the short segments, and the middle lateral grooves are connected to the short segments of the shoulder main groove.

In the pneumatic tire according to the present invention, it is preferable that the center lateral grooves on both sides of the center main groove are arranged to shift in the tire circumferential direction, the center lateral grooves and the middle lateral grooves on both sides of the middle main groove are arranged to shift in the tire circumferential direction, and the middle lateral grooves and the shoulder lateral grooves on both sides of the shoulder main groove are arranged to shift in the tire circumferential direction.

In the pneumatic tire according to the present invention, it is preferable that an angle $\gamma1$ with respect to the tire circumferential direction of the center lateral grooves is smaller than an angle $\gamma2$ with respect to the tire circumferential direction of the middle lateral grooves, and the angle $\gamma2$ with respect to the tire circumferential direction of the middle lateral grooves is smaller than an angle $\gamma3$ with respect to the tire circumferential direction of the shoulder lateral grooves.

In the pneumatic tire according to the present invention, it is preferable that the angle $\gamma1$ with respect to the tire circumferential direction of the center lateral grooves is 60 degrees to 80 degrees, and the angle $\gamma3$ with respect to the tire circumferential direction of the shoulder lateral grooves is 80 degrees to 90 degrees.

Effects of the Invention

According to the pneumatic tire of the present invention, the groove width WA of the center lateral grooves is equal to the groove width WB of the middle lateral grooves, and the ratio WC/WA of the groove width WC of the shoulder lateral grooves and the groove width WA of the center lateral grooves is 1.3 to 2.3.

Thereby, the allocation of the groove width WA of the center lateral grooves, the groove width WB of the middle lateral grooves, and the groove width WC of the shoulder lateral grooves becomes proper, and it is possible to achieve both of the wet performance and wear resistance.

More specifically, because the groove width WC is larger than the groove width WA and the groove width WB, water in the tread surface is quickly discharged to the outside of the tread edge through the shoulder lateral grooves.

Thereby, it is possible to improve the wet performance, while securing sufficient wear resistance by a high land ratio.

MODE FOR CARRYING OUT THE INVENTION

Hereinafter, an embodiment of the present invention will be described with reference to the drawings.

Figure 1:
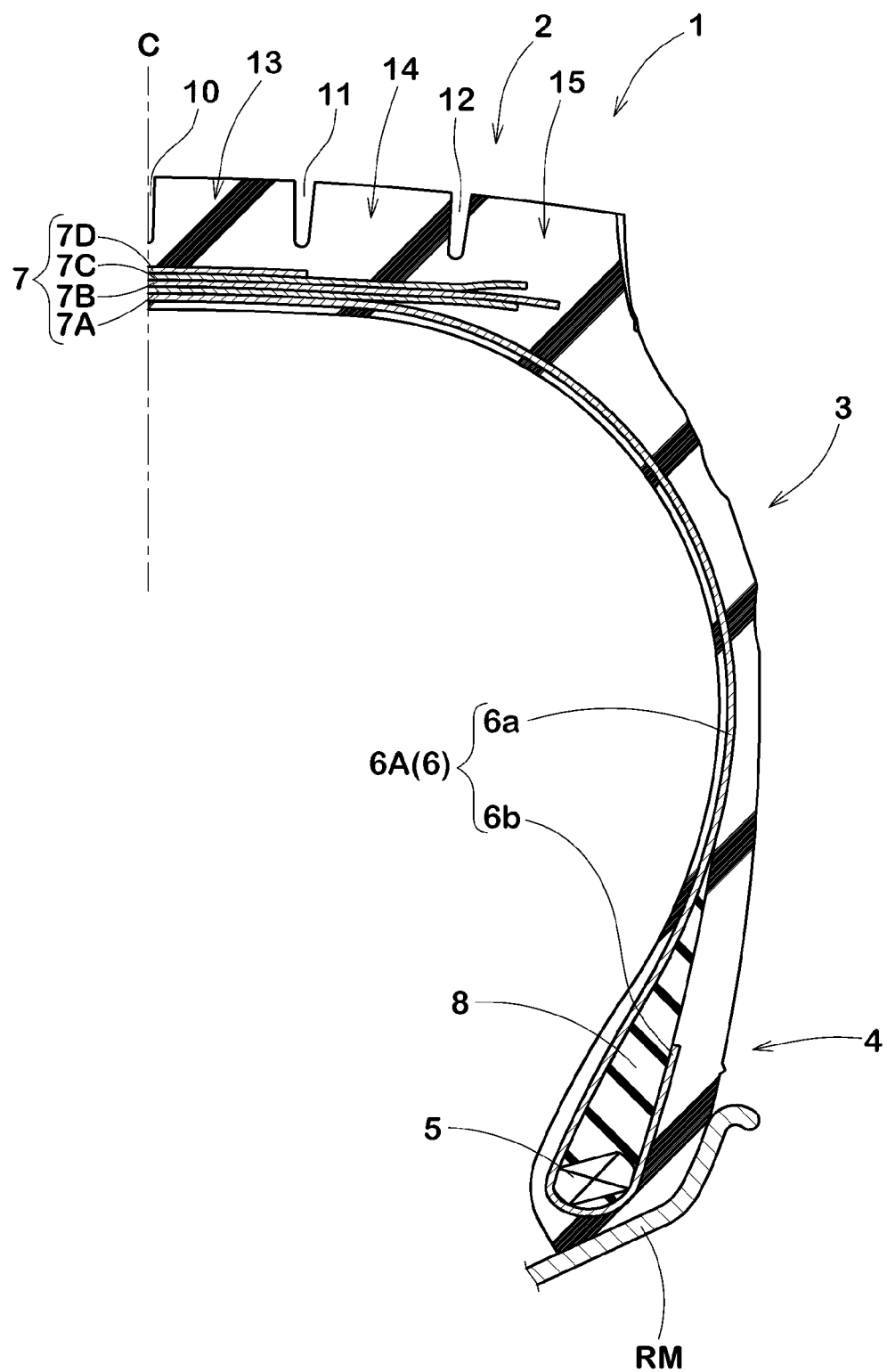
FIG. 1 a sectional view showing a pneumatic tire as an embodiment of the present invention FIG. 2 a developed view of the tread portion in FIG. 1

FIG. 1 is a tire meridian cross sectional view including the tire rotational axis, of a pneumatic tire 1 as first embodiment of the present invention under the normal state. Here, the normal state is an unloaded state of the tire which is mounted on a normal rim RM and inflated to a normal internal pressure.

Hereinafter, dimensions of various portions of the tire are values measured in the normal state unless otherwise noted.

The "normal rim" is a rim specified for the tire by a standard included in a standardization system on which the tire is based, for example, "standard rim" in JATMA, "Design Rim" in TRA, "Measuring Rim" in ETRTO.

The "normal internal pressure" is an air pressure specified for the tire by a standard included in a standardization system on which the tire is based, for example, "Maximum air pressure" in JATMA, the maximum value listed in the "TIRE LOAD LIMITS AT VARIOUS COLD INFLATION PRESSURES" table in TRA, and "INFLATION PRESSURE" in ETRTO.

As shown in FIG. 1, the pneumatic tire 1 according to the present invention comprises a toroidal carcass 6 extending from a tread portion 2 to a bead core 5 of a bead portion 4 through a sidewall portion 3, and a belt layer 7 disposed radially outside of the carcass 6 and in the tread portion 2, and the like.

In this embodiment, the pneumatic tire 1 is a tubeless tire to be mounted on a 15 degree tapered rim RM.

The carcass 6 is composed of a carcass ply 6A of carcass cords arranged at an angle of for example 80 to 90 degrees with respect to the tire equator C.

At each end of a ply main portion 6a extending between the bead cores 5, 5, the carcass ply 6A is successively provided with a ply turnup portion 6b folded back around the bead core 5 from the axially inside to the outside.

Between the ply main portion 6a and the ply turnup portion 6b, there is disposed a triangular bead apex rubber 8 extending radially outwardly from the bead core 5.

The belt layer 7 is disposed radially outside the carcass 6 and within the tread portion 2.

The belt layer 7 is composed of a plurality of belt plies using steel belt cords.

The belt layer 7 in this embodiment comprises four plies which are an innermost belt ply 7A of belt cords arranged at an angle of about 60+/−10 degrees with respect to the tire equator C for example, and belt plies 7B, 7C and 7D of belt cords arranged at small angles of about 15 degrees to about 35 degrees with respect to the tire equator C which are arranged outside the innermost belt ply in sequence.

The belt layer 7 increases the belt rigidity and firmly reinforces almost entire width of the tread portion 2 by being provided with at least one position at which the belt cords intersect with each other between the plies.

The bead core 5 has a laterally-long flat hexagonal cross sectional shape, and its radially inner surface is inclined at an angle of 12 degrees to 18 degrees with respect to the tire axial direction, and thereby the engage force with the rim RM is increased over a wide range.

Figure 2:
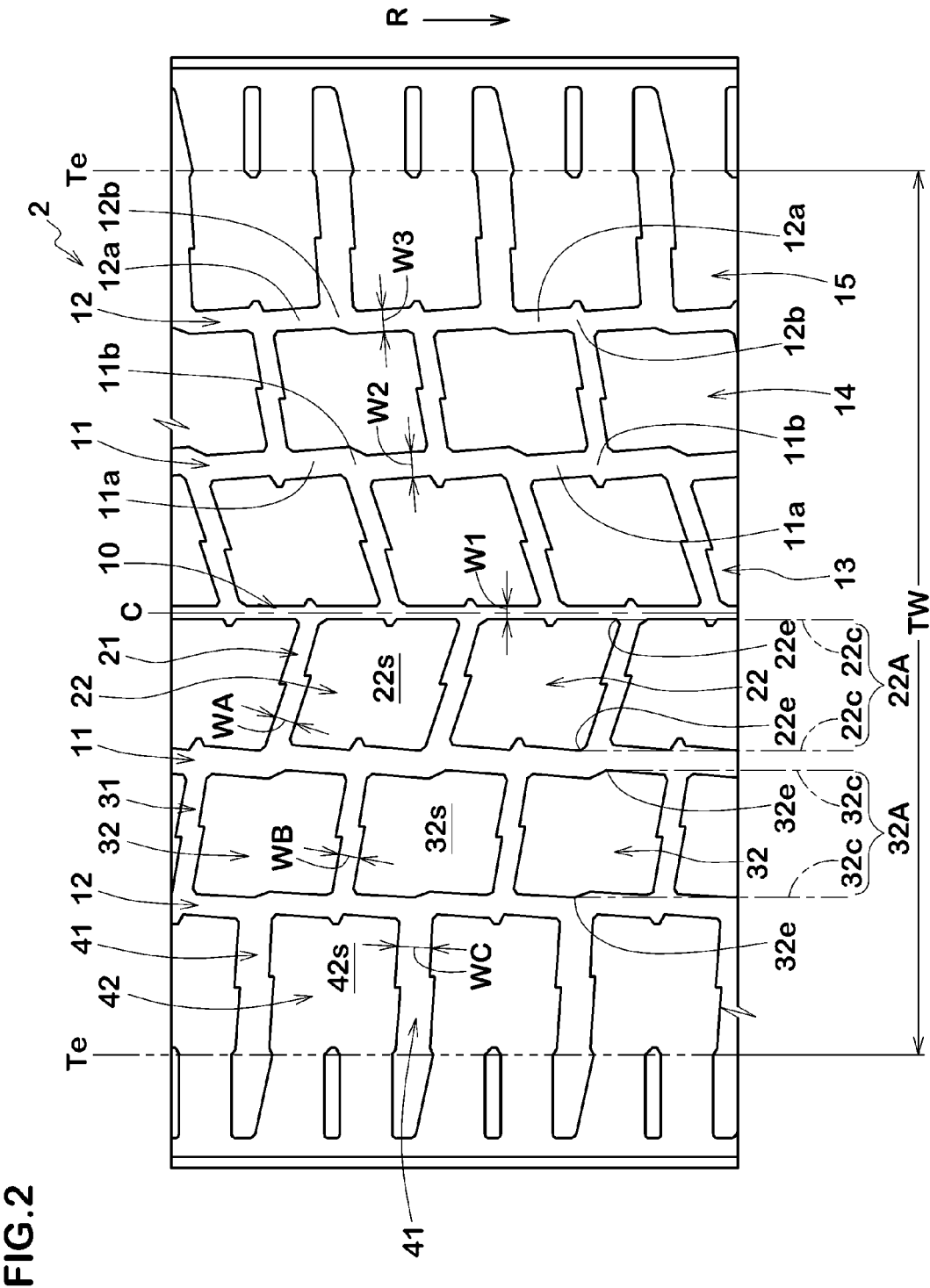

FIG. 2 is a developed view of the tread portion 2 of the pneumatic tire 1 in this embodiment. As shown in FIG. 2, in the pneumatic tire 1 in this embodiment, the tread portion 2 has a directional pattern for which a rotational direction R of the tire is specified.

The rotational direction R is indicated in the sidewall portion 3 by characters or the like for example.

In the tread portion 2, there are formed a center main groove 10 extending continuously in the tire circumferential direction on the tire equator C, a pair of middle main grooves 11 disposed on both sides of the tire equator C and extending zigzag and continuously in the tire circumferential direction, a pair of shoulder main grooves 12 extending zigzag and continuously in the tire circumferential direction on the axially inside of the tread edges Te and on the axially outside of the middle main grooves 11.

The tread edge Te means the axially outermost ground contacting edge when the tire under the normal state is contacted with a plane by loading a normal load at a camber angle of 0 degree.

The "normal load" is a load specified for the tire by a standard included in a standardization system on which the tire is based, "Maximum load capacity" in JATMA, the maximum value described in "TIRE LOAD LIMITS AT VARIOUS COLD INFLATION PRESSURES" table in TRA, "Load capacity" in ETRTO.

The center main groove 10 extends straight in the tire circumferential direction.

By the center main groove 10 disposed on the tire equator C, the drainage in the tread portion 2 is increased, and the wet performance is improved.

The groove width W1 of the center main groove 10 is preferably not less than 0.8%, more preferably not less than 1.2%, but preferably not more than 2.4, more preferably not more than 2.0 of the tread width TW.

If the groove width W1 of the center main groove 10 is less than 0.8% of the tread width TW, then the groove volume becomes insufficient in the vicinity of the tire equator C where the ground pressure is high, and there is a possibility that the drainage can not be fully improved.

Meanwhile, if the groove width W1 of the center main groove 10 exceeds 2.4% of the tread width TW, then since the actual ground contact area of the center land portion 13 where the ground contact pressure is high is decreased, the load applied per unit area becomes increased, and there is a possibility that the wear resistance is decreased.

The middle main groove 11 has long segments 11a inclined with respect to the tire circumferential direction, and short segments 11b inclined to the opposite direction to the long segments 11a and being smaller in the circumferential length than the long segment 11a.

The short segments 11b are inclined to the axially outside toward the later-contacting-side from the prior-contacting-side in the rotational direction.

The long segments 11a and the short segments 11b are alternately arranged in the tire circumferential direction to constitute the zigzag middle main groove 11.

The angle $\alpha 1$ with respect to the tire circumferential direction of the long segment 11a of the middle main groove 11 is preferably 2 to 10 degrees for example.

If the angle $\alpha 1$ is less than 2 degrees, there is a possibility that the rigidity in the tire axial direction of the tread portion 2 decreases.

If the angle $\alpha 1$ is more than 10 degrees, there is a possibility that the drainage performance of the tire can not be fully improved.

The shoulder main groove 12 has long segments 12a inclined with respect to the tire circumferential direction, and short segments 12b inclined to the opposite direction to the long segments 12a and being smaller in the circumferential length than the long segment 12a.

The short segments 12b are inclined to the same direction as the short segments 11b of the middle main groove 11.

The long segments 12a and the short segments 12b are arranged alternately in the tire circumferential direction to constitute the zigzag shoulder main groove 12.

The angle $\alpha 2$ with respect to the tire circumferential direction of the long segments 12a of the shoulder main groove 12 is, for example, the same as the angle $\alpha 1$.

The zigzag pitches of the middle main groove 11 are equal to the zigzag pitches of the shoulder main groove 12.

The zigzag of the middle main grooves 11 and the zigzag of the shoulder main groove 12 are arranged so that the phases are sifted in the tire circumferential direction.

By the middle main grooves 11 and the shoulder main grooves 12, noise generated from the middle main grooves 11 and the shoulder main groove 12 is dispersed, and the noise performance is improved.

In order to achieve a proper distribution of the rigidity of the tread portion 2, while increasing the drainage performance of the tread portion 2, for example, it is preferred that the groove width W3 of the shoulder main grooves 12 is larger than the groove width W1 of the center main grooves 10, and the groove width W2 of the middle main grooves 11 is larger than the groove width W3 of the shoulder main grooves 12.

In order to ensure the rigidity of the tread portion 2, while increasing the drainage performance of the tread portion 2, for example, it is preferred that the groove depths of the center main groove 10, the middle main grooves 11 and the shoulder main grooves 12 are 15 to 25 mm.

By the center main groove 10, the middle main grooves 11 and the shoulder main groove 12, the tread portion 2 is divided into a plurality of regions. The tread portion 2 has a pair of center land portions 13 between the center main groove 10 and the middle main grooves 11, a pair of middle land portions 14 between the middle main grooves 11 and the shoulder main groove 12, and a pair of shoulder land portions 15 located axially outside of the shoulder main grooves 12.

In other words, on both sides of the middle main groove 11, the center land portion 13 and the middle land portion 14 are disposed. On both sides of the shoulder main groove 12, the middle land portion 14 and the shoulder land portion 15 are disposed.

Figure 3:
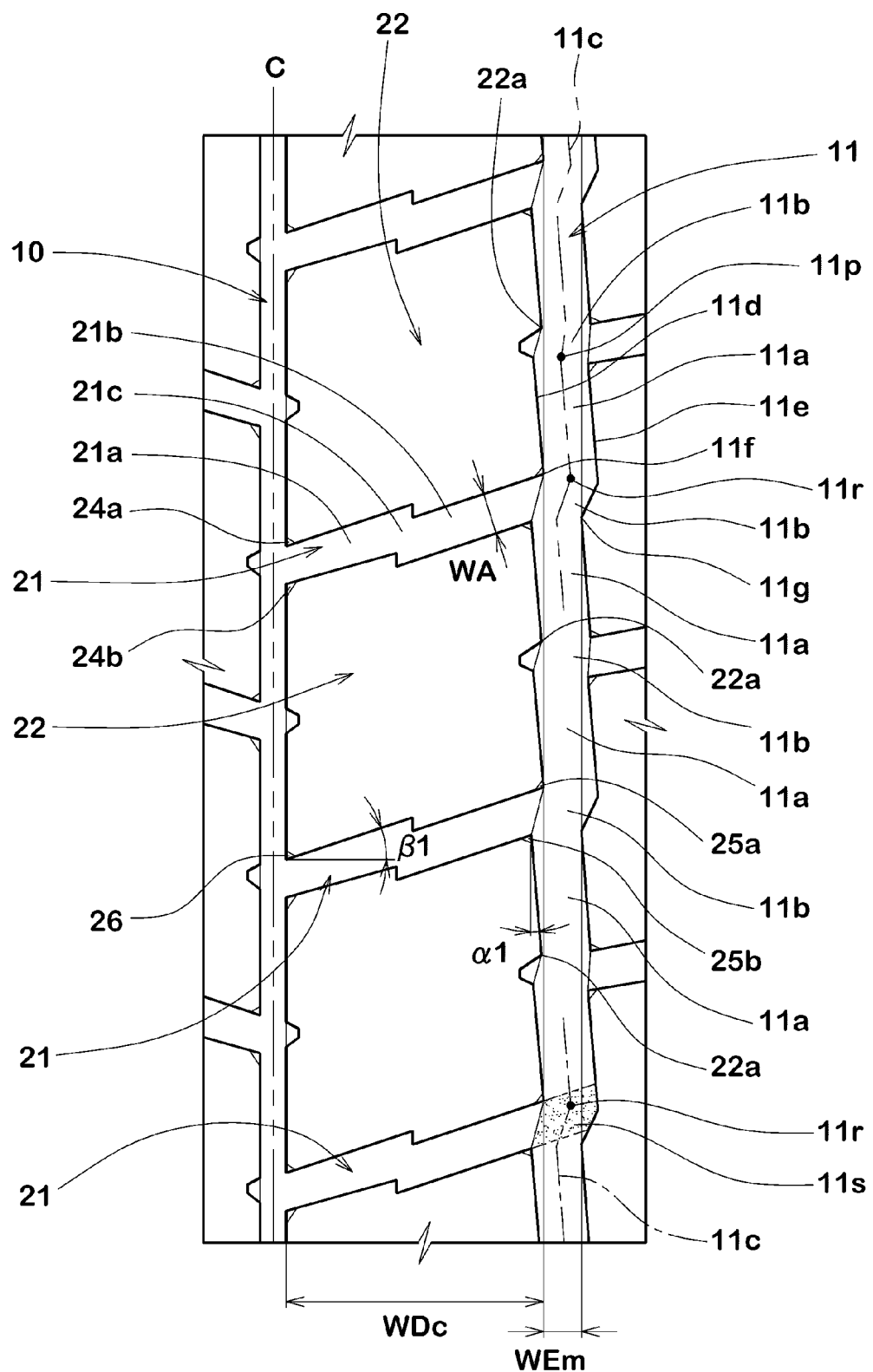
FIG. 3 an enlarged developed view of the center land portion in FIG. 2

In FIG. 3, there is shown an enlarged view of the center land portion 13.

The center land portion 13 is provided with a plurality of center lateral grooves 21.

In order to obtain sufficient drainage, it is preferred that at least fifty center lateral grooves 21 are disposed.

The center lateral groove 21 extends in the axial direction of the tire, and connects between the center main groove 10 and the middle main groove 11 on both sides of the center land portion 13.

Thereby, the center land portion 13 is a block row in which a plurality of center blocks 22 are arranged.

Since the center lateral grooves 21 are inclined with respect to the tire axial direction, the treads 22s of the center blocks 22 in this embodiment have a substantially parallelogram shape.

The middle main groove 11 has
a groove edge 11d on the center land portion 13 side and
a groove edge 11e on the middle land portion 14 side.

In the middle main groove 11, vertices 11f of the groove edge 11d on the most groove center line 11c side are positioned on the center land portion 13 side of vertices 11g of the groove edge 11e on the most groove center line 11c side.

Thereby, a region linearly continuous in the circumferential direction is formed in the zigzag middle main groove 11, therefore, the drainage performance of the tread portion 2 is improved.

In the context of the middle main grooves 11 and the center land portion 13, the axial distance WEm between
the vertices 11f of the groove edge 11d on the most groove center line 11c side, and the vertices 11g of the groove edge 11e on the most groove center line 11c side is 0.07 to 0.13 times the maximum width WDC in the tire axial direction of the center block 22.

If the axial distance WEm between the vertices 11f and 11g is less than 0.07 times the maximum axial width WDC of the center block 22, there is a possibility that the drainage is not fully improved.

If the axial distance WEm between the vertices 11f and 11g is more than 0.13 times the maximum axial width WDC of the center block 22, there is a possibility that the wear resistance of the center land portion 13 is reduced.

As shown in FIG. 3, the middle main groove 11 has axially inner zigzag vertices 11p and axially outer zigzag vertices 11r which are positioned on the groove center line 11c.

The center lateral grooves 21 intersect with the middle main grooves 11 at the zigzag vertices 11r of the middle main grooves 11.

Thereby, water flow in the middle main grooves 11 and the center lateral groove 21 is smoothened.

Here, "the center lateral grooves 21 intersect with the middle main grooves 11 at the zigzag vertices 11r of the middle main grooves 11" means that the zigzag vertex 11r of the groove center line 11c of the middle main groove 11 exists within a region 11s shown in FIG. 3 by hatching in which the middle main groove 11 and the center lateral groove 21 intersect (the same applies to the intersection of the middle main grooves 11 and the middle lateral grooves 31, the intersection of the shoulder main grooves 12 and the middle lateral grooves 31, and the intersection of the shoulder main grooves 12 and the shoulder lateral grooves 41).

The center lateral groove 21 is a zigzag groove having a first portion 21a extending obliquely with respect to the tire axial direction, a second portion 21b shifted in the tire circumferential direction from the first portion 21a and extending parallel with the first portion 21a, and a third portion 21c connecting between the first portion 21a and the second portion 21b.

It is preferable that the depth of the center lateral grooves 21 is, for example, not more than the depth of the middle main grooves 11.

The pitches of the center lateral grooves 21 are two times the zigzag pitches of the middle main grooves 11.

In other words, the zigzag pitches of the middle main grooves 11 is ½ times the pitches of the center lateral grooves 21. Therefore, the center block 22 is provided in a central portion in the tire circumferential direction of its tread 22s with a zigzag block vertex 22a facing the middle main groove 11 and projecting outwardly in the tire axial direction.

In the center block 22, chamfers 24a and 24b are formed at block vertices at which the center main groove 10 and the center lateral grooves 21 intersect, and chamfers 25a and 25b are formed at block vertices at which the middle main grooves 11 and the center lateral grooves 21 intersect.

Such chamfers 24a, 24b, 25a and 25b alleviate stress concentration on the block vertices, and suppress damage such as chipping.

Instead of the chamfers 24a, 24b, 25a and 25b, rounded corners may be formed.

Figure 4:
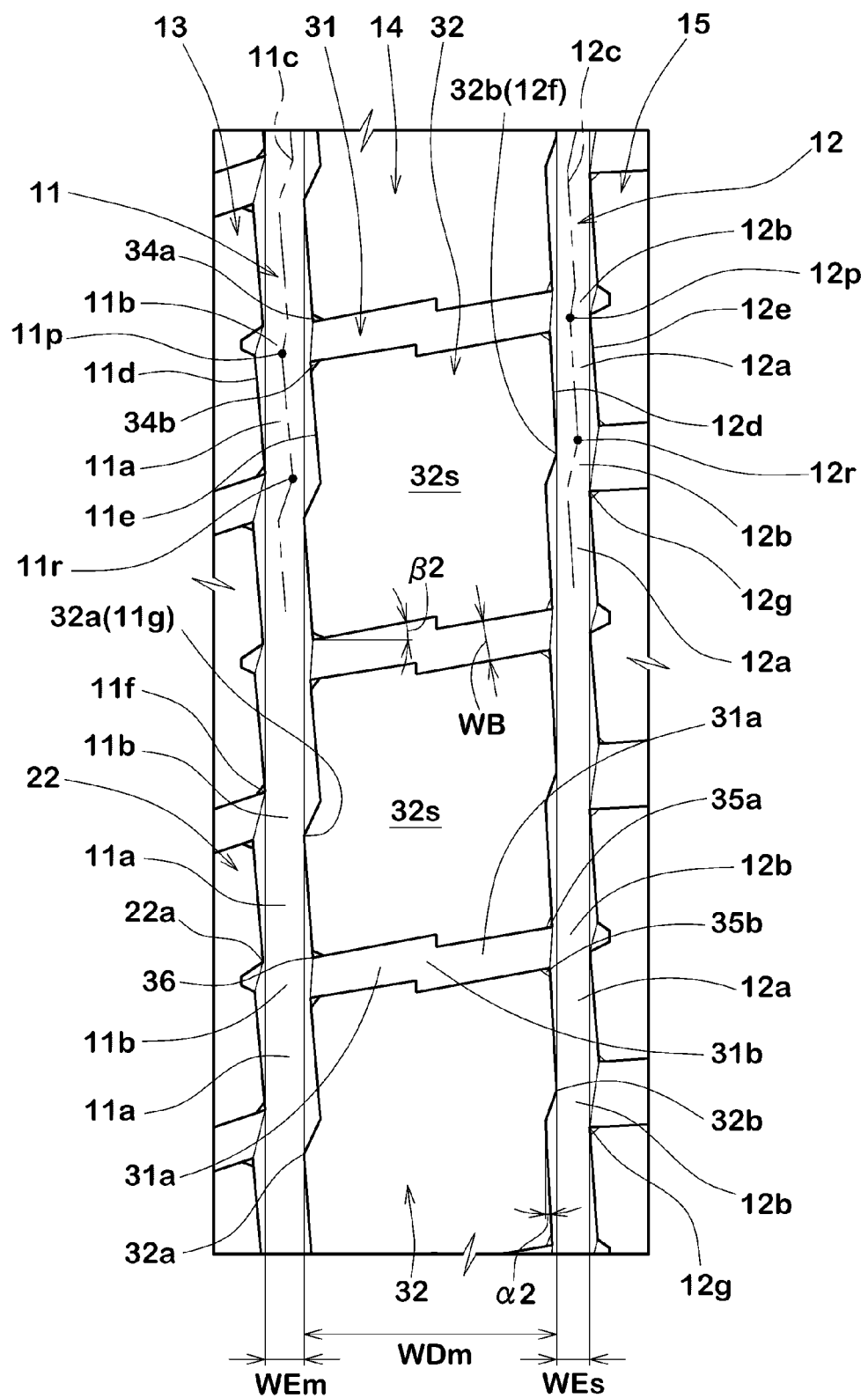
FIG. 4 an enlarged developed view of the middle land portion in FIG. 2

FIG. 4 shows an enlarged view of the middle land portion 14.

The middle land portion 14 is provided with a plurality of middle lateral grooves 31. In order to obtain sufficient drainage, it is preferred that at least fifty middle lateral grooves 31 are provided.

The middle lateral groove 31 extends in the tire axial direction, and one end is connected to the middle main groove 11 and the other end is connected to the shoulder main groove 12. Thereby, the middle land portion 14 is a block row in which a plurality of middle blocks 32 are arranged.

As shown in FIG. 2, the center blocks 22 and the middle blocks 32 positioned on both sides of the middle main groove 11 are arranged so as to shift in the tire circumferential direction by a half pitch.

Since the middle lateral grooves 31 are inclined with respect to the tire axial direction, the treads 32s of the middle blocks 32 in this embodiment have a substantially parallelogram shape.

As shown in FIG. 4, the shoulder main groove 12 has a groove edge 12d on the middle land portion 14 side and a groove edge 12e on the shoulder land portion 15 side.

In the shoulder main groove 12, the vertices 12f of the groove edge 12d on the most groove center line 12c side are positioned on the middle land portion 14 side of the vertices 12g of the groove edge 12e on the most groove center line 12c side. Thereby, a region which is linearly continuous in the circumferential direction is formed in the zigzag middle main groove 11, and thereby the drainage performance of the tread portion 2 is improved.

In the context of the middle main grooves 11 and the middle land portion 14, the axial distance WEm between the vertices 11f of the groove edge 11d on the most groove center line 11c side, and the vertices 11g of the groove edge 11e on the most groove center line 11c side is 0.07 to 0.13 times the maximum axial width WDm of the middle blocks 32.

If the axial distance WEm between the vertices 11f and the vertices 11g is less than 0.07 times the maximum axial width WDm of the middle blocks 32, there is a possibility that the drainage is not fully improved.

If the axial distance WEm between the vertices 11f and the vertices 11g is more than 0.13 times the maximum axial width WDm of the middle blocks 32, there is a possibility that the wear resistance of the middle land portion 14 is deteriorated.

Similarly, in the context of the shoulder main grooves 12 and the middle land portion 14, the axial distance WEs between the vertices 12f of the groove edge 12d on the most groove center line 12c side, and the vertices 12g of the groove edge 12e on the most groove center line 12c side is 0.07 to 0.13 times the maximum axial width WDm of the middle blocks 32.

If the axial distance WEs between the vertices 12f and the vertices 12g is less than 0.07 times the maximum axial width WDm of the middle blocks 32, there is a possibility that the drainage performance is not fully improved.

If the axial distance WEs between the vertices 12f and the vertices 12g is more than 0.13 times the maximum axial width WDm of the middle blocks 32, there is a possibility that the wear resistance of the middle land portion 14 is deteriorated.

The shoulder main groove 12 has axially inner zigzag vertices 12p and axially outer zigzag vertices 12r which are on the groove center line 12c as shown in FIG. 4.

The middle main grooves 11 intersect the middle axial groove 31 at the zigzag vertices 11p of the middle main groove 11. As a result, water flow in the middle main groove 11 and the middle lateral grooves 31 is smoothened.

On the other hand, the middle lateral grooves 31 intersect the shoulder main groove 12 at the zigzag vertices 12p of the shoulder main groove 12. Thereby, water flow in the shoulder main groove 12 and the middle lateral grooves 31 is smoothened.

The middle lateral groove 31 is a zigzag-shaped groove having
a first portion 31a which extends obliquely with respect to the tire axial direction,
a second portion 31b which extends parallel with the first portion 31a and which is shifted in the tire circumferential direction from the first portion 31a, and
a third portion 31c which connects between the first portion 31a and the second portion 31b.

For example, the depth of the middle lateral grooves 31 is preferably not more than the depths of the middle main groove 11 and the shoulder main groove 12.

The pitches of the middle lateral grooves 31 are equal to the center lateral grooves 21 and two times the zigzag pitches of the middle main groove 11 and the shoulder main groove 12.

In other words, the zigzag pitches of the middle main groove 11 and the shoulder main groove 12 are ½ times the pitches of the middle lateral grooves 31.

Therefore, a center portion in the tire circumferential direction of the tread 32s of the middle block 32 is provided with zigzag block vertices 32a projecting axially inwardly and facing the middle main groove 11, and zigzag block vertices 32b projecting axially outwardly and facing the shoulder main groove 12.

The block vertices, at which the middle lateral grooves 31 intersect the middle main groove 11, are provided with chamfers 34a and 34b.

The block vertices, at which the middle lateral grooves 31 intersect the shoulder main groove 12, are provided with chamfers 35a and 35b.

Such chamfers 34a, 34b, 35a and 35b alleviate stress concentration on the block vertices, and suppress damage such as chipping.

Instead of the chamfers 34a, 34b, 35a and 35b, rounded corners may be formed.

Figure 5:
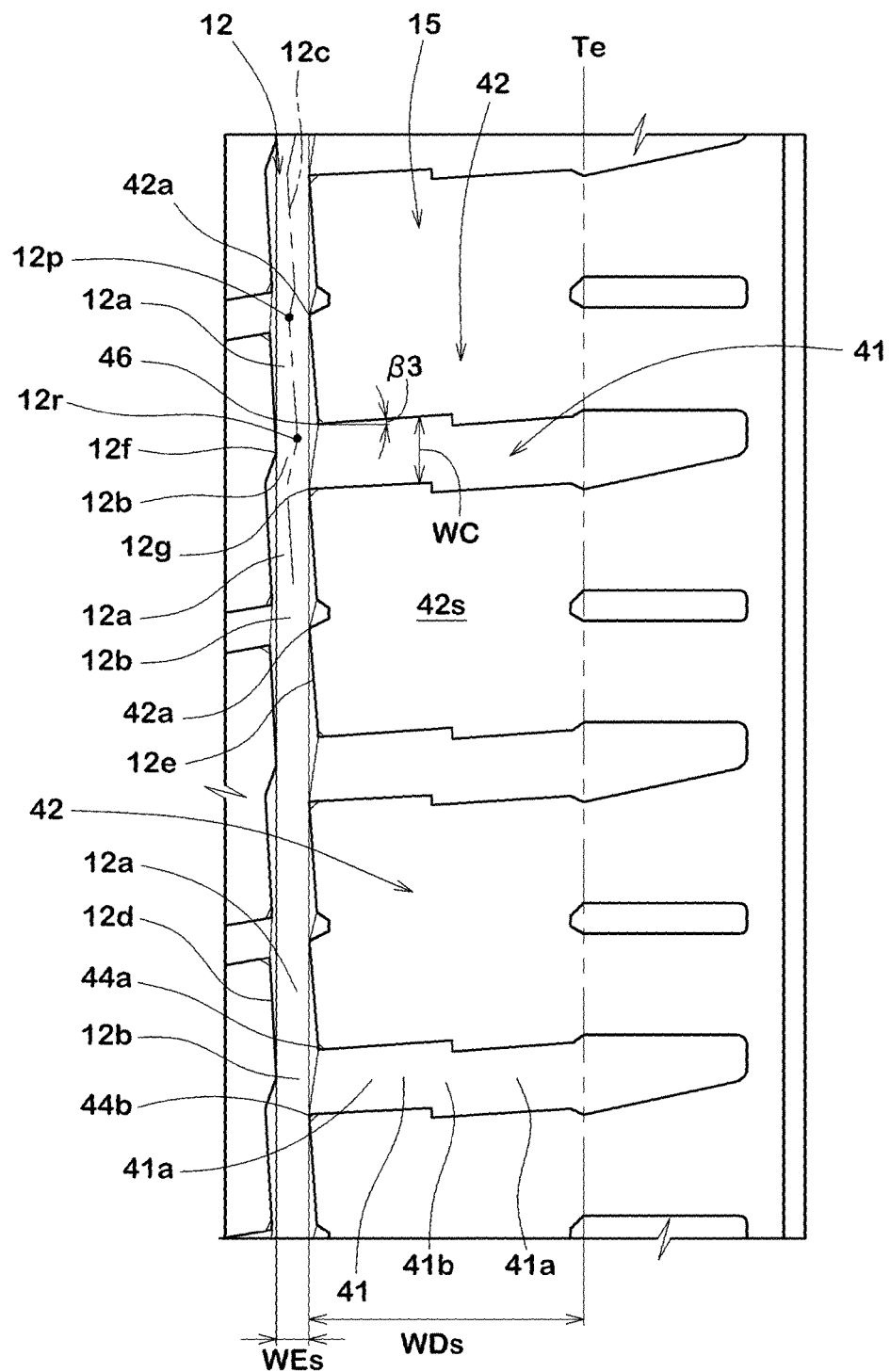
FIG. 5 an enlarged developed view of the shoulder land portion in FIG. 2

In FIG. 5, an enlarged view of the shoulder land portion 15 is shown.

The shoulder land portion 15 is provided with a plurality of the shoulder lateral grooves 41. Preferably, at least fifty shoulder lateral grooves 41 are disposed in order to obtain sufficient drainage performance.

The shoulder lateral groove 41 extends in the tire axial direction, and one end and the other end are respectively connected to the shoulder main groove 12 and the tread edge Te. Thereby, the shoulder land portion 15 is a block row in which a plurality of shoulder blocks 42 are arranged.

The middle blocks 32 and the shoulder blocks 42 positioned on both sides of the shoulder main groove 12 are shifted in the tire circumferential direction by a half pitch as shown in FIG. 2.

In relation to the shoulder main groove 12 and the shoulder land portion 15, the axial distance WEs between the vertices 12f of the groove edge 12d on the most groove center line 12c side, and the vertices 12g of the groove edge 12e on the most groove center line 12c side is 0.07 to 0.13 times the maximum axial width WDs of the shoulder blocks 42.

If the axial distance WEs between the vertices 12f and the vertices 12g is less than 0.07 times the maximum axial width WDs of the shoulder blocks 42, there is a possibility that the drainage performance is not fully improved.

If the axial distance WEs between the vertices 12f and the vertices 12g is more than 0.13 times the maximum axial width WDs of the shoulder blocks 42, there is a possibility that the wear resistance of the shoulder land portion 15 is deteriorated.

As shown in FIG. 5, the shoulder lateral grooves 41 intersect the shoulder main groove 12 at the zigzag vertices 12r of the shoulder main groove 12.

Thereby, the flow of water in the shoulder lateral groove 41 and the shoulder main grooves 12 is smoothened.

The shoulder lateral groove 41 is a zigzag-shaped groove having a first portion 41a which extends obliquely with respect to the tire axial direction, a second portion 41b which extends parallel with the first portion 41a and which is shifted in the tire circumferential direction from the first portion 41a, and a third portion 41c which connect between the first part 41a and the second portion 41b.

For example, the depth of the shoulder lateral grooves 41 is preferably not more than the depths of the middle main groove 11 and the shoulder main groove 12.

The pitches of the shoulder lateral grooves 41 are equal to the middle lateral grooves 31 and two times the zigzag pitches of the shoulder main groove 12.

In other words, the zigzag pitches of the shoulder main groove 12 is ½ times the pitches of the shoulder lateral grooves 41. Therefore, a central portion in the tire circumferential direction of the tread 42s of the shoulder block 42 is provided with a zigzag block vertex 42a projecting axially inwardly and facing the shoulder main groove 12.

The block vertices at which the shoulder lateral grooves 41 intersect the shoulder main groove 12 are provided with chamfers 44a and 44b.

Such chamfers 44a and 44b alleviate stress concentration on the block vertices, and suppress damage such as chipping.

Instead of the chamfers 44a and 44b, rounded corners may be formed.

In this embodiment, it is preferable that
the groove width WB of the middle lateral grooves 31 and
the groove width WA of the center lateral grooves 21
shown in FIGS. 2 to 5 are the same.
Further, the ratio WC/WA of
the groove width WC of the shoulder lateral grooves 41 and
the groove width WA of the center lateral grooves 21
is preferably 1.3 or more, more preferably 1.6 or more, and preferably 2.3 or less, more preferably 2.0 or less.

By setting the groove width WA of the center lateral grooves 21, the groove width WB of the middle lateral grooves 31, and
the groove width WC of the shoulder lateral grooves 41 in accordance with the above relationships,
the groove width WA, the groove width WB, and the groove width WC are properly allocated, and
it becomes possible to achieve both of the wet performance and the wear resistance.

More specifically, because the groove width WC is larger than the groove width WA and the groove width WB,
water in the tread surface is quickly discharged toward the outside of the tread edge Te through the shoulder lateral grooves 41. Thereby, the wet performance can be improved, while securing the sufficient wear resistance by the larger land ratio.

If the ratio WC/WA of the groove width WA of the shoulder lateral grooves 41 and the groove width WC of the center lateral grooves 21 is less than 1.3, there is a possibility that the water in the tread surface becomes difficult to be rapidly discharged toward the outside of the tread edge Te through the shoulder lateral grooves 41.

On the other hand, if the ratio WC/WA of the groove width WA of the shoulder lateral grooves 41 and the groove width WC of the center lateral grooves 21 is more than 2.3, there is a possibility that the rubber volume of the shoulder blocks 42 becomes insufficient, and uneven wear so called shoulder drop wear is caused.

It is preferable that the groove width WA of the center lateral grooves 21, the groove width WB of the middle lateral grooves 31, and the groove width WC of the shoulder lateral grooves 41 are at least 4 mm.

If the groove width WA, the groove width WB and groove width WC is less than 4 mm, the drainage in the tread portion 2 is decreased, and there is a possibility that the wet performance can not be improved.

As shown in FIG. 2, a ratio Lc/Lm of
a land ratio Lc of a center region 22A and
a land ratio Lm of a middle region 32A
is preferably 1.05 or more, more preferably 1.10 or more, and preferably 1.25 or less, more preferably 1.20 or less.

Here, the center region 22A is a region between tire-circumferential-direction lines 22c, 22c extending through both axial ends 22e, 22e of the center blocks 22.

The middle region 32A is a region between tire-circumferential-direction lines 32c, 32c extending through both axial ends 32e, 32e of the middle land portion 14.

If the ratio Lc/Lm of the land ratio Lc of the center region 22A and the land ratio Lm of the middle region 32A is smaller than 1.05 times, then as the actual ground contact area of the center land portion 13 where the ground contact pressure is high is decreased, the load applied to a unit area is increased, and
there is a possibility that the wear resistance is decreased.

On the other hand, if the ratio Lc/Lm of the land ratio Lc of the center region 22A and the land ratio Lm of the middle region 32A is more than 1.25 times, then the groove volume of in the center land portion 13 where the ground contact pressure is high becomes insufficient, and there is a possibility that the drainage is deteriorated.

More specifically, it is preferable that the land ratio Lc of the center region 22A is 75 to 85. If the land ratio Lc of the center region 22A is less than 75, as the actual ground contact area of the center land portion 13 where the ground contact pressure is high becomes small, there is a possibility that wear resistance is deteriorated as described above.

On the other hand, if the land ratio Lc of the center region 22A exceeds 85, the center land portion 13 lacks the groove volume, and there is a possibility that the drainage performance is deteriorated.

Similarly, it is preferable that the land ratio Lm of the middle area 32A is 65 to 75. If the land ratio Lm of the middle region 32A is less than 65, as the actual ground contact area of the middle land portion 14 becomes small, there is a possibility that the middle land portion 14 wears unevenly.

On the other hand, if the land ratio Lm of the middle region 32A is more than 75, the groove volume in the middle land portion 14 becomes insufficient, and there is a possibility that the drainage performance is deteriorated.

In this embodiment, it is preferable that an angle β1 (degree) with respect to the tire axial direction of the center lateral grooves 21, an angle β2 (degree) with respect to the tire axial direction of the middle lateral grooves 31, and an angle β3 (degree) with respect to the tire axial direction of the shoulder lateral grooves 41 as shown in FIGS. 3 to 5 satisfy the following relationships.

$$\beta 3 < \beta 2 < \beta 1 \quad (1)$$

$$10 =< \beta 1 =< 30 \quad (2)$$

$$0 =< \beta 3 =< 10 \quad (3)$$

In FIG. 3, the angle β1 of the center lateral groove 21 is an angle with respect to the tire axial direction of the groove edge of the center lateral groove 21 at the vertex 26 of the center block 22.

In FIG. 4, the angle β2 of the middle lateral groove 31 is an angle with respect to the tire axial direction of the groove edge of the middle axial groove 31 at the vertex 36 of the middle block 32.

In FIG. 5, the angle β3 of the shoulder lateral groove is an angle with respect to the tire axial direction of the groove edge of the shoulder lateral groove 41 at the vertex 46 of the shoulder block 42.

If the corner of each block is chamfered or rounded, the vertex is an intersection of an extension of the groove edge of each main groove and an extension of the groove edge of each lateral groove.

By satisfying the relationship of the expression (1), water is smoothly discharged through the center lateral grooves 21, the middle lateral grooves 31 and the shoulder lateral grooves 41, from the center land portion 13 where the ground contact pressure is high to the shoulder land portion 15 where the ground pressure is low, and the drainage performance of the tire is enhanced.

In the expression (2), if the angle β1 of the center lateral grooves 21 is less than 10 degrees, there is a possibility that the drainage performance in the center land portion 13 is deteriorated.

On the other hand, if the angle β1 of the center lateral grooves 21 is more than 30 degrees, the block vertex 26 of the center block 22 becomes an excessively acute angle, which may become a starting point of uneven wear.

In the expression (3), if the angle β3 of the shoulder lateral grooves 41 is less than 0 degree, the inclination of the shoulder lateral grooves 41 with respect to the tire axial direction becomes reversed, and there is a possibility that the drainage performance in the shoulder land portion 15 is deteriorated.

On the other hand, if the angle β3 of the shoulder lateral grooves 41 is more than 10 degrees, the block vertex 46 of the shoulder block 42 becomes an excessively acute angle, which may become a starting point of uneven wear.

Hereinafter, a pneumatic tire as a second embodiment of the present invention will be described.

As to portions of the pneumatic tire in the second embodiment which are not described in the following, the above described configurations of the pneumatic tire 1 in the first embodiment may be employed.

Figure 6:
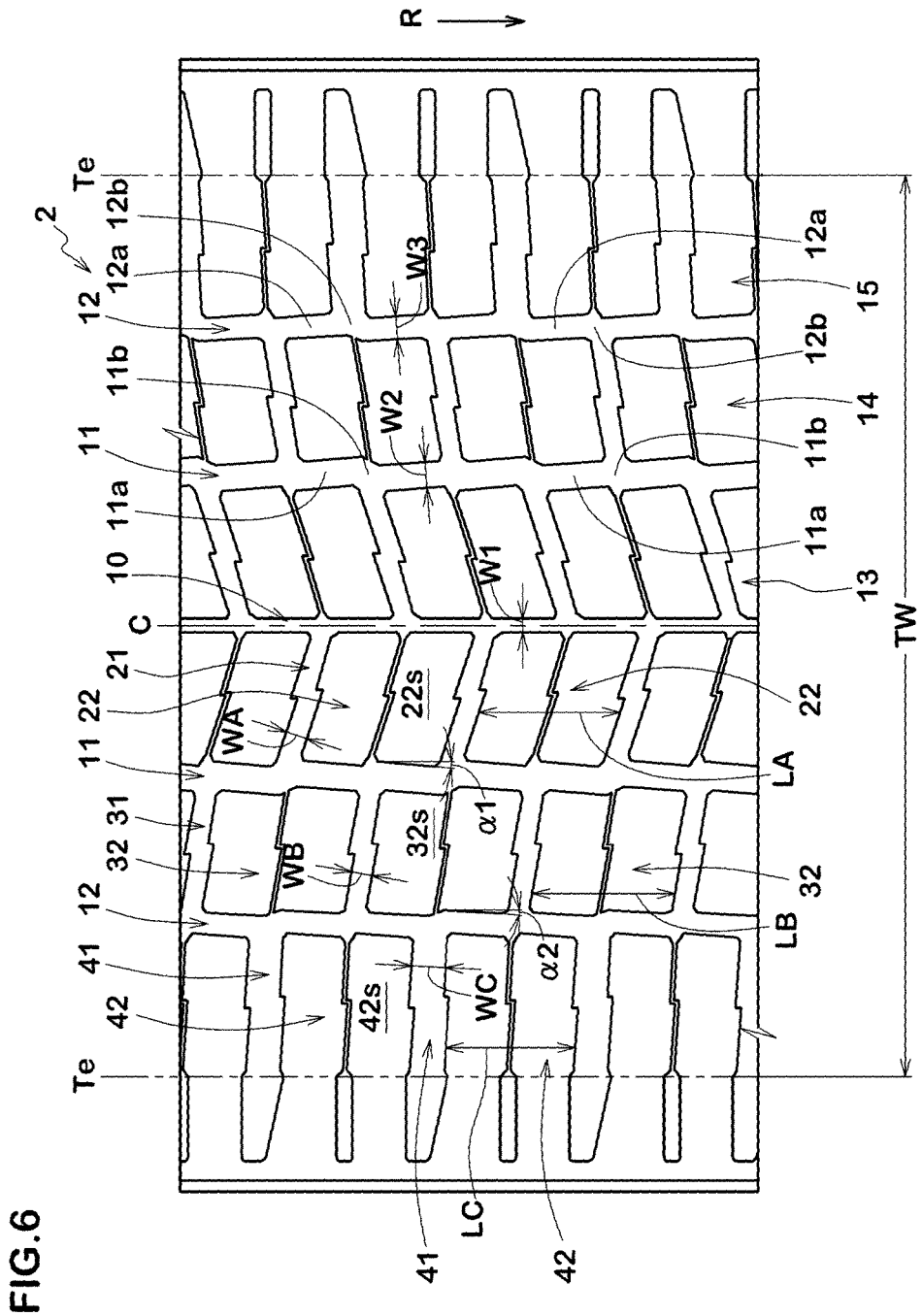
FIG. 6 a developed view of a tread portion showing a pneumatic tire as another embodiment of the present invention FIG. 7 an enlarged developed view of the center land portion in FIG. 6

In FIG. 6, a developed view of the tread portion 2 of the pneumatic tire in this embodiment is shown.

The center lateral grooves 21, 21 on both sides of the center main groove 10 are shifted in the tire circumferential direction by a half pitch for example.

By the center lateral grooves 21, 21, pitch noises generated from the center lateral grooves 21, 21 are prevented from being superimposed, and thereby the noise performance is improved. Furthermore, the distribution of the ground contact pressure in the center land portion 13 adjacent in the tire axial direction is dispersed, and uneven wear of the center land portion 13 is suppressed.

The center lateral grooves 21 and the middle lateral grooves 31 on both sides of the middle main groove 11 are shifted in the tire circumferential direction by a half pitch for example.

Thereby, the center blocks 22 and the middle blocks 32 disposed on both sides of the middle main groove 11 are shifted in the tire circumferential direction by a half pitch.

By the center lateral grooves 21 and middle lateral grooves 31, pitch noises generated from the center lateral grooves 21 and the middle lateral grooves 31 are prevented from being superimposed, and thereby the noise performance is improved. Furthermore, the distribution of the ground contact pressure in the adjacent center land portion 13 and middle land portion 14 is dispersed, and uneven wear of the center land portion 13 and middle land portion 14 is suppressed.

Figure 7:
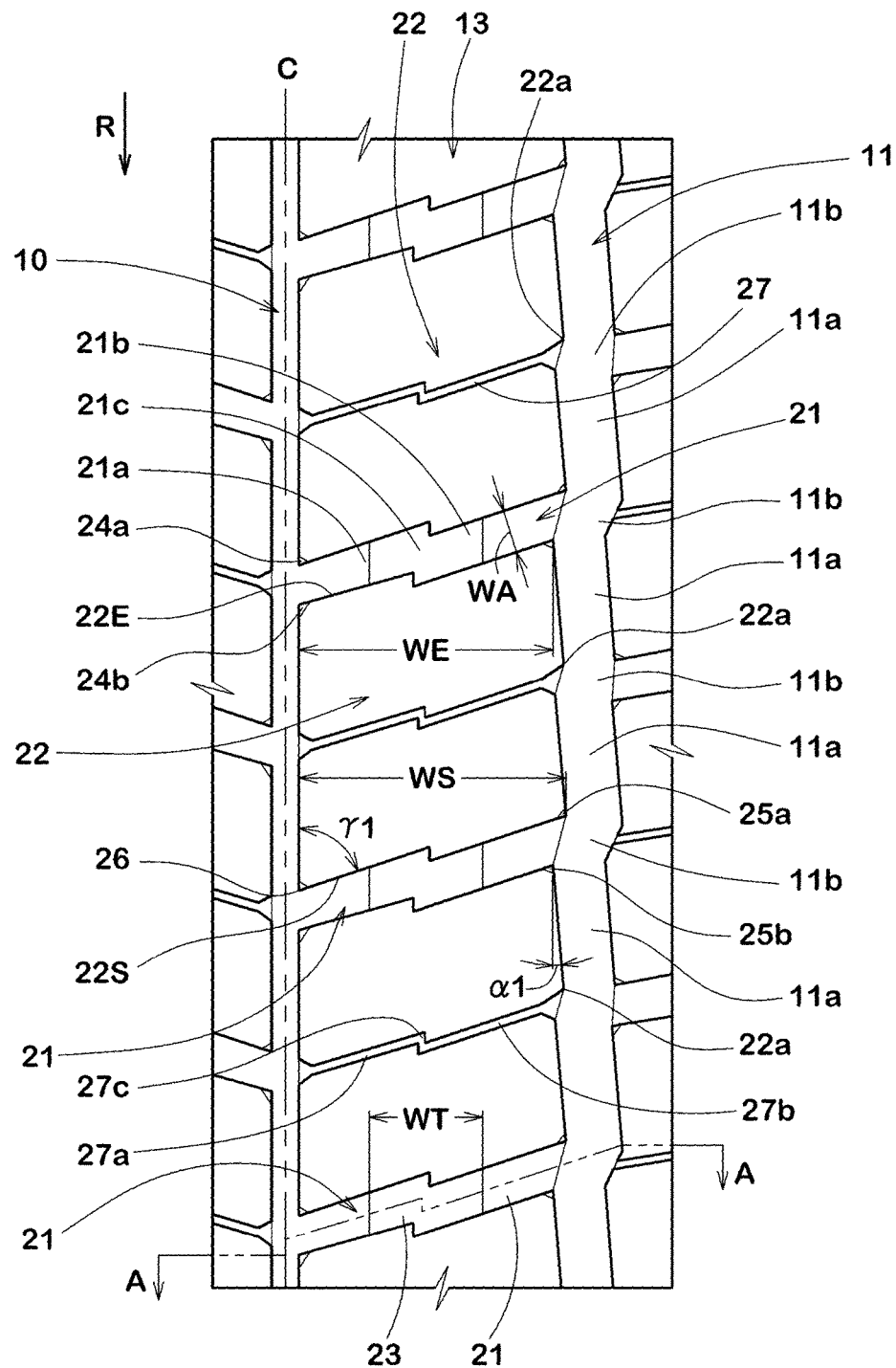

In FIG. 7, an enlarged view of the center land portion 13 is shown.

Toward the axially outer end from the axially inner end, the center lateral groove 21 is inclined to the later-contacting-side in the rotational direction R.

The center lateral grooves 21 are inclined to the same direction as the short segments 11b of the middle main grooves 11.

The center lateral grooves 21 are connected to the middle main groove 11 in the short segments 11b.

Thereby, a difference occurs between the axial lengths of the opposite edges of the center lateral groove 21.

More specifically, the axial length WS of the prior-contacting-side edge 22s of the center block 22 becomes larger than the axial length WE of the later-contacting-side edge 22E.

Therefore, in the vicinity of the prior-contacting-side edge 22S, the rigidity of the center block 22 is increased, and uneven wear such as so-called heel-and-toe wear is suppressed. Such function and effect are particularly effective in the center land portion 13 where the ground pressure is high.

Furthermore, as described above, since the rigidity of the center block 22 is increased in the vicinity of the prior-contacting-side edge 22S, the center lateral grooves 21 secure sufficient groove volume when the center blocks 22 contact with the ground.

Moreover, as the center lateral grooves 21 and the middle main grooves 11 are inclined to the same direction, water in the center lateral grooves 21 are smoothly discharged to the middle main groove 11.

By the synergistic effect of these, the drainage in the tread portion 2 is increased, and the wet performance of the pneumatic tire is improved.

The center lateral groove 21 in this embodiment is provided with a tie bar 23 connecting between the center blocks 22 adjacent to each other in the tire circumferential direction.

Figure 8:
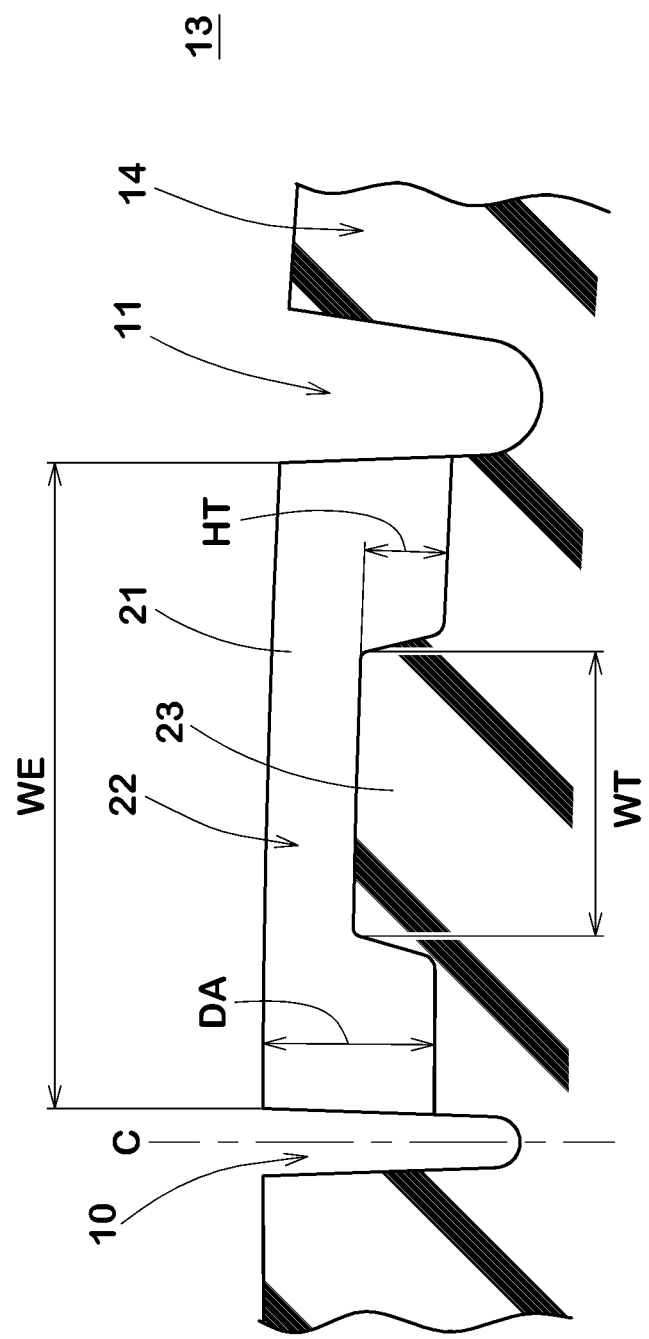
FIG. 8 an A-A line cross-sectional view of FIG. 7

In FIG. 8, A-A line cross-sectional view of the center land portion 13 in FIG. 7, that is, the cross-sectional view of the center land portion 13 including the tie bar 23 is shown. The tie bar 23 is formed by a raised groove bottom of the center lateral groove 21.

The tie bar 23 controls movements in the tire circumferential direction of the center blocks 22 when contacting with the ground, in particular, when stepping in or kicking out, and thereby suppresses uneven wear such as heel and toe wear.

For example, the height HT of the tie bar 23 is preferably ⅓ to ½ times the groove depth DA of the center lateral groove 21.

If the height HT of the tie bar 23 is less than ⅓ times the groove depth DA, the movements in the tire circumferential direction of the center block 22 when contacting with the ground increase, and there is a possibility that the center blocks 22 wear unevenly.

On the other hand, if the height HT of the tie bar 23 is more than ½ of the groove depth DA, there is a possibility that the drainage of the center lateral groove 21 is reduced.

For example, the axial width WT of the tie bar 23 is preferably ⅓ to ½ times the axial width WE of the later-contacting-side edge 22E of the center block 22.

If the width WT of the tie bar 23 is less than ⅓ times the width WE of the later-contacting-side edge 22E, the movements in the tire circumferential direction of the center blocks 22 when contacting with the ground are increased, and there is a possibility that uneven wear occurs in the center blocks 22.

On the other hand, if the width WT of the tie bar 23 is more than ½ times the width WE of the later-contacting-side edge 22E, there is a possibility that the drainage of the center lateral groove 21 is deteriorated.

As shown in FIG. 7, the center block 22 is provided with a plurality of center lateral shallow grooves 27.

One end and the other end of the center lateral shallow groove 27 are connected to the center main groove 10 and the short segment 11b of the middle main groove 11, respectively. Similarly to the center lateral groove 21, the center lateral shallow groove 27 is a zigzag-shaped groove having a first portion 27a which extends obliquely with respect to the tire axial direction, a second portion 27b which shifts in the tire circumferential direction from the first portion 27a and which extends parallel with the first portion 27a, and a third portion 27c which connects between the first portion 27a and the second portion 27b.

The depth of the center lateral shallow grooves 27 is smaller than the depth of the center lateral grooves 21.

The width of the center lateral shallow grooves 27 is smaller than the width of the center lateral grooves 21.

By the center lateral shallow grooves 27, the drainage of the center land portion 13 is increased, and at the same time, the rigidity distribution in the center block 22 is optimized.

Figure 9:
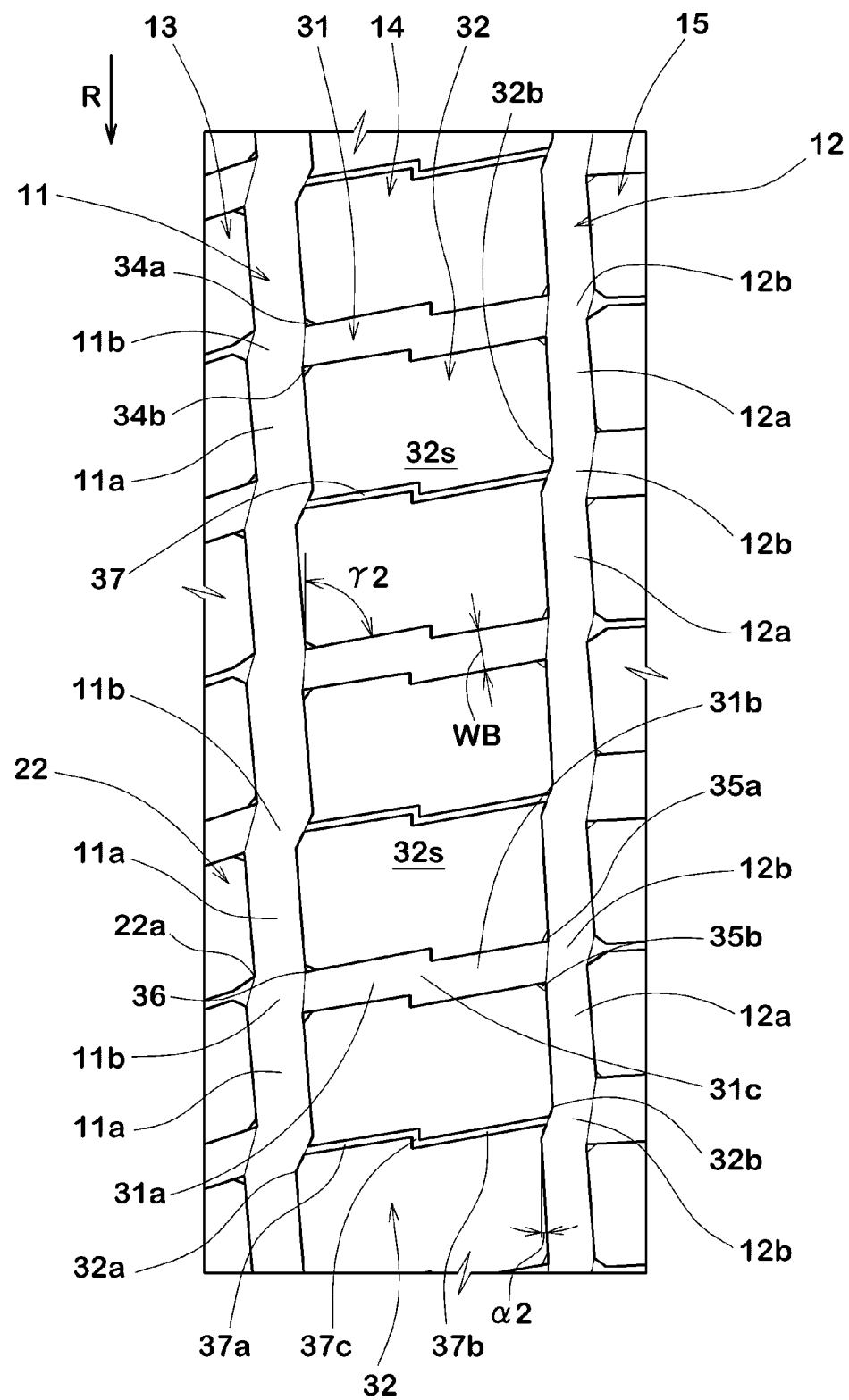
FIG. 9 an enlarged developed view of the middle land portion in FIG. 7

In FIG. 9, there is shown an enlarged view of the middle land portion 14.

Toward the axially outer end from the axially inner end, the middle lateral groove 31 is inclined to the later-contacting-side in the rotational direction R.

The middle lateral grooves 31 are inclined to the same direction as the short segments 11b of the middle main grooves 11.

In addition, the middle lateral grooves 31 are connected to the middle main groove 11 in the short segments 11b.

Thereby, water in the middle main groove 11 is smoothly discharged to the middle lateral grooves 31.

Similarly, the middle lateral grooves 31 are inclined to the same direction as the short segments 12b of the shoulder main groove 12.

In addition, the middle lateral grooves 31 are connected to the shoulder main groove 12 in the short segments 12b.

Thus, water in the middle lateral grooves 31 are smoothly discharged to the shoulder main groove 12.

Therefore, the drainage is increased from the center land portion 13 to the middle land portion 14 of the tread portion 2, and the wet performance of the pneumatic tire is improved.

The middle block 32 is provided with a plurality of middle lateral shallow grooves 37.

One end and the other end of the middle lateral shallow groove 37 are respectively connected to the short segment 11b of the middle main groove 11 and the short segment 12b of the shoulder main groove 12.

Similarly to the middle lateral groove 31, the middle lateral shallow groove 37 is a zigzag-shaped groove having a first portion 37a which extends obliquely with respect to the tire axial direction, a second portion 37b which extends parallel with the first portion 37a and which is shifted in the tire circumferential direction from the first portion 37a, and a third portion 37c which connects between the first portion 37a and the second portion 37b.

The depth of the middle lateral shallow groove 37 is smaller than the depth of the middle lateral groove 31.

The width of the middle lateral shallow groove 37 is smaller than the width of the middle lateral grooves 31.

By the middle lateral shallow grooves 37, the drainage of the middle land portion 14 is increased, and at the same time, the rigidity distribution of the middle block 32 is optimized.

Figure 10:
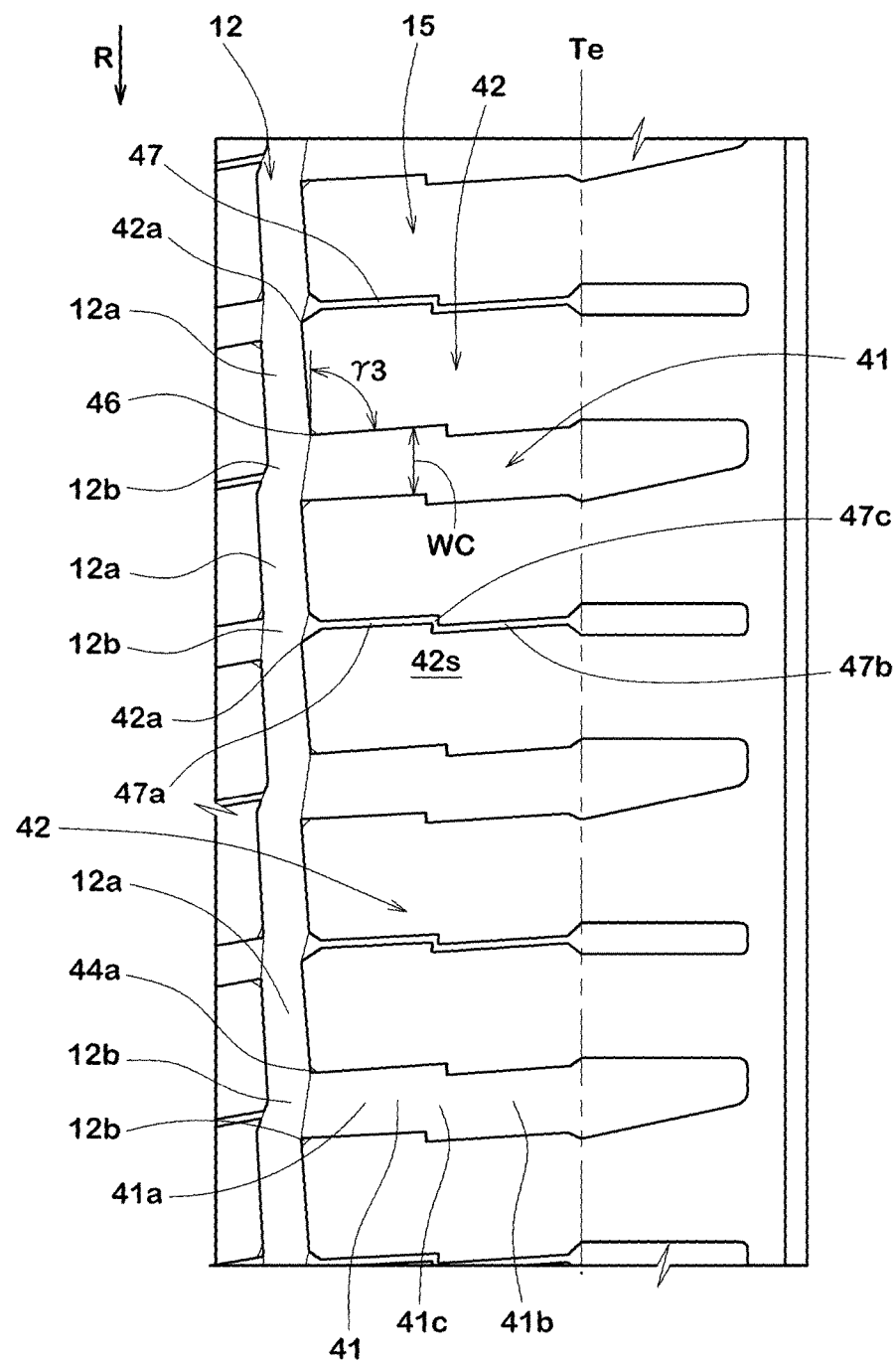
FIG. 10 an enlarged developed view of the shoulder land portion in FIG. 7

In FIG. 10, there is shown an enlarged view of the shoulder land portion 15.

The middle lateral grooves 31 and the shoulder lateral grooves 41 on both sides of the shoulder main groove 12 are shifted in the tire circumferential direction by a half pitch.

Thereby, the middle blocks 32 and the shoulder blocks 42 disposed on both sides of the shoulder main groove 12 are shifted in the tire circumferential direction by a half pitch. By the middle lateral grooves 31 and shoulder lateral grooves 41, pitch sounds generated from the middle lateral grooves 31 and the shoulder lateral grooves 41 is prevented from being superimposed, and thereby the noise performance is improved. Furthermore, the distribution of the ground contact pressure in the adjacent middle land portion 14 and the adjacent shoulder land portion 15 is dispersed, and uneven wear of the middle land portion 14 and the shoulder land portion 15 is suppressed.

The shoulder block 42 is provided with a plurality of shoulder lateral shallow grooves 47.

One end the other end of the shoulder lateral shallow groove 47 are respectively connected to the short segment 12b of the shoulder main groove 12 and the tread edge Te.

Similarly to the shoulder lateral groove 41, the shoulder lateral shallow groove 47 is a zigzag-shaped groove having a first portion 47a which extends obliquely with respect to the tire axial direction, a second portions 47b which extends parallel with the first portion 47a and which shifts in the tire circumferential direction from the first portion 47a, and a third portion 47c which connects between the first portion 47a and the second portion 47b.

The depth of the shoulder lateral shallow groove 47 is smaller than the depth of the shoulder lateral grooves 41.

The width of the shoulder lateral shallow groove 47 is smaller than the width of the shoulder lateral grooves 41.

By the shoulder lateral shallow grooves 47, the drainage of the shoulder land portion 15 is increased, and at the same time, the rigidity distribution in the shoulder block 42 is optimized.

It is preferable that, as shown in FIGS. 7, 9 and 10, the angle γ1 with respect to the tire circumferential direction of the center lateral groove 21 is, for example, smaller than the angle γ2 with respect to the tire circumferential direction of the middle lateral groove 31, and the angle γ2 is, for example, smaller than the angle γ3 with respect to the tire circumferential direction of the shoulder lateral groove 41.

By setting the angles β1, γ2 and γ3 of the center lateral groove 21, the middle lateral groove 31 and the shoulder lateral groove 41 as becoming increased sequentially, water is smoothly discharged from the vicinity of the tire equator C in the center land portion 13 where the ground pressure is high and which first contacts with the ground to the tread edge Te of the shoulder land portion 15 where the ground pressure is low and which last contacts with the ground, and excellent drainage performance can be obtained.

For example, the angle γ1 is preferably 60 degrees or more, and preferably 80 degrees or less, more preferably 75 degrees or less.

If the angle γ1 is less than 60 degrees, the block vertex 26 of the center block 22 becomes an excessively acute angle, which may become a starting point of uneven wear.

On the other hand, if the angle γ1 is more than 80 degrees, there is a possibility that the drainage performance of the center land portion 13 is deteriorated.

For example, the angle γ3 is preferably 80 degrees or more, more preferably 85 degrees or more, and preferably 90 degrees or less.

If the angle γ3 is less than 80 degrees, the block vertex 46 of the shoulder block 42 becomes an excessively acute angle, which may become a starting point of uneven wear.

On the other hand, if the angle γ3 is more than 90 degrees, the inclination of the shoulder lateral groove 41 with respect to the tire axial direction is reversed, and there is a possibility that the drainage performance in the shoulder land portion 15 is deteriorated.

As shown in FIGS. 6, 7, 9 and 10, it is preferable that the groove width WA of the center lateral groove 21 is, for example, not more than the groove width WB of the middle lateral grooves 31, and the groove width WB of the middle lateral groove 31 is, for example, less than the groove width WC of the shoulder lateral groove 41.

By the center lateral grooves 21, the middle lateral grooves 31 and the shoulder lateral grooves 41, water is discharged smoothly from the vicinity of the tire equator C in the center land portion 13 where the ground contact pressure is high and which first contacts with the ground to the tread edge Te of the shoulder land portion 15 where the ground contact pressure is low and which last contacts with the ground, and excellent drainage performance can be obtained.

For example, the ratio WC/WA of the groove width WC of the shoulder lateral groove 41 and the groove width WA of the center lateral groove 21 is preferably 1.50 or more, more preferably 1.60 or more, and preferably 2.50 or less, more preferably 2.00 or less. If the ratio WC/WA is less than 1.50, there is a possibility that the drainage from the shoulder main groove 12 to the tread edge Te becomes insufficient.

On the other hand, if the ratio WC/WA is more than 2.50, the land ratio of the shoulder land portion 15 is decreased, and the wear resistance may be deteriorated.

For example, the ratio WC/WB of the groove width WC of the shoulder lateral groove 41 and the groove width WB of the middle lateral groove 31 is preferably 1.50 or more, more preferably 1.60 or more, and preferably 2.50 or less, more preferably 2.00 or less.

If the ratio WC/WB is less than 1.50, there is a possibility that the drainage from the shoulder main groove 12 to the tread edge Te becomes insufficient similarly to the above.

On the other hand, if the ratio WC/WB is more than 2.50, the land ratio of the shoulder land portion 15 is reduced similarly to the above, and there is a possibility that the wear resistance and uneven wear resistance are deteriorated.

It is preferable that the ratio WA/LA of the circumferential length LA of the center block 22 and the groove width WA of the center lateral groove 21 shown in FIG. 6, is 0.08 to 0.10.

If the ratio WA/LA is less than 0.08, the groove width WA of the center lateral groove 21 becomes insufficient, and there is a possibility that the drainage from the vicinity of the tire equator C to the middle main groove 11 becomes insufficient. On the other hand, if the ratio WA/LA is more than 0.10, the land ratio of the center land portion 13 is decreased, and there is a possibility that the wear resistance and uneven wear resistance are deteriorated.

Similarly, it is preferable that the ratio WB/LB of the groove width WB of the middle lateral groove 31 shown in FIG. 6 and the circumferential length LB of the middle block 32 is 0.10 to 0.20.

If the ratio WB/LB is less than 0.10, the groove width WB of the middle lateral groove 31 becomes insufficient, and there is a possibility that the drainage from the vicinity of the middle main grooves 11 to the shoulder main groove 12 becomes insufficient.

On the other hand, if the ratio WB/LB is more than 0.20, the land ratio of the middle land portion 14 is reduced, and there is a possibility that the wear resistance and uneven wear resistance are deteriorated.

Similarly, it is preferable that the ratio WC/LC of the circumferential length LC of the shoulder block 42 and the groove width WC of the shoulder lateral groove 41 shown in FIG. 6 is 0.20 to 0.30.

If the ratio WC/LC is less than 0.20, the groove width WC of the shoulder lateral groove 41 becomes insufficient, and there is a possibility that the drainage from the vicinity of the shoulder main groove 12 to the tread edge Te becomes insufficient.

On the other hand, if the ratio WC/LC is more than 0.30, the land ratio of the shoulder land portion 15 is reduced, and there is a possibility that the wear resistance and uneven wear resistance are deteriorated.

While detailed description has been made of the pneumatic tires of the present invention, the present invention can be embodied in various forms without being limited to the illustrated embodiments.

Working Examples

Pneumatic tires of size 11.00R20 having the basic structure shown in FIG. 1 were experimentally manufactured based on the specifications shown in Table 1, and tested for wet braking performance and wear resistance.

Test methods were as follows.

<Wet Braking Performance>

Each test tire under the conditions of a 20×8.00 rim and internal pressure of 780 kPa, was attached to all wheels of a truck (2-D vehicle) whose maximum load was 8 tons.

The vehicle was brought into a wet asphalt road surface having a water film of a thickness of 0.5 mm to 2.0 mm, and during running at a speed of 65 km/h, brake was applied and the distance required to decrease the speed from 60 km/h to 20 km/h was measured.

Using inverses of the measured values, the results are indicated by an index based on the value of Example 1 as being 100, wherein the larger the number, the better the wet performance.

<Wear Resistance>

After running for 50000 km with the vehicle. the groove depths of each tire was measured.

The results are indicated by an index based on the value of Example 1 as being 100, wherein the larger the number, the better the wear resistance.

The vehicle was brought into a wet asphalt road surface having a water film of a thickness of 5 mm, and the time required to travel 10 meters was measured from the moment the clutch was connected, while keeping the shift gears at second gear and the engine speed at 1500 rpm, and it was indexed.

The result is a reciprocal of each traveling time and indicated by an index based on the value of working Example 1 being 100. The larger the number, the better the drainage performance.

<Uneven Wear Performance>

Each test tire under the conditions of a 20×8.00 rim and internal pressure of 780 kPa, was attached to one of the rear

TABLE 1

|  | Working Ex. 1 | Working Ex. 2 | Working Ex. 3 | Working Ex. 4 | Working Ex. 5 | Working Ex. 6 |
|---|---|---|---|---|---|---|
| WB/WA | 1 | 1 | 1 | 1 | 1 | 1 |
| WC/WA | 1.8 | 1.8 | 1.8 | 1.8 | 1.8 | 1.3 |
| Lc/Lm | 1.15 | 1.15 | 1.15 | 1.25 | 1.05 | 1.15 |
| W1/TW | 1.6 | 2.4 | 0.8 | 1.6 | 1.6 | 1.6 |
| Wet braking performance(index) | 100 | 105 | 95 | 95 | 105 | 95 |
| Wear resistance(index) | 100 | 95 | 105 | 105 | 95 | 105 |

|  | Working Ex. 7 | Working Ex. 8 | Working Ex. 9 | Working Ex. 10 | Working Ex. 11 | Working Ex. 12 |
|---|---|---|---|---|---|---|
| WB/WA | 1 | 1 | 1 | 1 | 1 | 1 |
| WC/WA | 2.3 | 1.6 | 2 | 1.8 | 1.8 | 1.8 |
| Lc/Lm | 1.15 | 1.15 | 1.15 | 1.15 | 1.15 | 0.95 |
| W1/TW | 1.6 | 1.6 | t6 | 0.4 | 2.8 | 1.6 |
| Wet braking performance(index) | 105 | 98 | 102 | 90 | 110 | 110 |
| Wear resistance(index) | 95 | 102 | 98 | 110 | 90 | 90 |

|  | Working Ex. 13 | Comparative Ex. 1 | Comparative Ex. 2 | Comparative Ex. 3 |
|---|---|---|---|---|
| WB/WA | 1 | 0.8 | 1 | 1 |
| WC/WA | 1.8 | 1.8 | 1 | 2.6 |
| Lc/Lm | 1.35 | 1.15 | 1.15 | 1.15 |
| W1/TW | 1.6 | t6 | 1.6 | 1.6 |
| Wet braking performance(index) | 90 | 80 | 80 | 110 |
| Wear resistance(index) | 110 | 110 | 110 | 80 |

As apparent from Table 1, it was confirmed that, as compared with the comparative examples, the pneumatic tires of the working Examples were significantly improved in the wet performance and the wear resistance.

Pneumatic tires of size 11.00R20 having the basic structure shown in FIG. 6 were experimentally manufactured based on the specifications shown in Table 2, and tested for the wet performance and uneven wear resistance.

Test methods were as follows.

<Wet Performance>

Each test tire under the conditions of a 20×8.00 rim and internal pressure of 780 kPa, was attached to all wheels of a truck (2-D vehicle) whose maximum load was 10 tons.

wheels of a truck (2-D vehicle) whose maximum load was 10 tons. To the other of the rear wheels, working Example 1 tire was attached, and then it was run until the wear of either tire reached 50%.

After running, by the naked eye, each tire was checked for each block row in the center land portions, middle land portions and shoulder land portions, whether uneven wear was caused or not. The results are indicated by an index based on working Example 1 being 100, the larger the number, the better the uneven wear resistance.

TABLE 2

|  | Comparative Ex. | Working Ex. 1 | Working Ex. 2 | Working Ex. 3 | Working Ex. 4 | Working Ex. 5 | Working Ex. 6 |
|---|---|---|---|---|---|---|---|
| center lateral grooves' connecting positions | long segments | short segments | short segments | short segments | short segments | short segments | short segments |
| tie bar | absent | present | absent | present | present | present | present |
| middle lateral grooves' connecting positions | long segments | short segments | short segments | long segments | short segments | short segments | short segments |
| y1 (deg.) | 70 | 70 | 70 | 70 | 50 | 60 | 80 |
| y2 (deg.) | 80 | 80 | 80 | 80 | 60 | 70 | 85 |
| y3 (deg.) | 85 | 85 | 85 | 85 | 70 | 80 | 90 |
| WA (mm) | 4 | 4 | 4 | 4 | 4 | 4 | 4 |

TABLE 2-continued

| | | | | | | | |
|---|---|---|---|---|---|---|---|
| WB (mm) | 4 | 4 | 4 | 4 | 4 | 4 | 4 |
| WC (mm) | 7 | 7 | 7 | 7 | 7 | 7 | 7 |
| WC/WA | 1.75 | t75 | 1.75 | 1.75 | 1.75 | 1.75 | t75 |
| WC/WB | 1.75 | 1.75 | 1.75 | 1.75 | 1.75 | 1.75 | 1.75 |
| Wet performance(index) | 90 | 100 | 105 | 95 | 110 | 105 | 95 |
| Uneven wear performance(grade) | 90 | 100 | 90 | 95 | 85 | 95 | 105 |

| | Working Ex. 7 | Working Ex. 8 | Working Ex. 9 | Working Ex. 10 | Working Ex. 11 | Working Ex. 12 | Working Ex. 13 |
|---|---|---|---|---|---|---|---|
| center lateral grooves' connecting positions | short segments | short segments | short segments | short segments | short segments | short segments | short segments |
| tie bar | present | present | present | present | present | present | present |
| middle lateral grooves' connecting positions | short segments | short segments | short segments | short segments | short segments | short segments | short segments |
| y1 (deg.) | 82 | 70 | 70 | 70 | 70 | 70 | 70 |
| y2 (deg.) | 87 | 80 | 80 | 80 | 80 | 80 | 80 |
| y3 (deg.) | 92 | 85 | 85 | 85 | 85 | 85 | 85 |
| WA (mm) | 4 | 5 | 4 | 5 | 4 | 4 | 4 |
| WB (mm) | 4 | 4 | 7 | 5 | 4 | 4 | 4 |
| WC (mm) | 7 | 7 | 6 | 7 | 6 | 10 | 11 |
| WC/WA | 1.75 | 1.4 | 1.5 | 1.4 | 1.5 | 2.5 | 2.75 |
| WC/WB | 1.75 | 1.75 | 0.86 | 1.4 | 1.5 | 2.5 | 2.75 |
| Wet performance(index) | 85 | 100 | 100 | 105 | 95 | 105 | 105 |
| Uneven wear performance(grade) | 105 | 90 | 90 | 85 | 105 | 90 | 85 |

As apparent from Table 2, it was confirmed that, as compared with the comparative examples, the pneumatic tires of working Examples were significantly improved in the wet performance and the wear resistance.

DESCRIPTION OF THE REFERENCE NUMERALS 1 pneumatic tire
2 tread portion
11 middle main groove
11a long segment
11b short segment
12 shoulder main groove
13 center land portion
14 middle land portion
15 shoulder land portion
21 center lateral groove
22 center block
23 tie bar
31 middle lateral groove
32 middle block
41 shoulder lateral groove
42 shoulder block

The invention claimed is:
1. A pneumatic tire comprising
a tread portion provided with a center main groove extending continuously in the tire circumferential direction,
a pair of middle main grooves extending continuously in the tire circumferential direction on both sides of the center main groove,
a pair of shoulder main grooves extending continuously in the tire circumferential direction between the middle main grooves and tread edges,
a plurality of center lateral grooves connecting between the center main groove and the middle main grooves,
a plurality of middle lateral grooves connecting between the middle main grooves and the shoulder main grooves, and
a plurality of shoulder lateral grooves connecting between the shoulder main grooves and the tread edges, so as to have
a pair of center block rows of center blocks which are divided by the center main groove, the middle main grooves and the center lateral grooves, and arranged at intervals in the tire circumferential direction,
a pair of middle block rows of middle blocks which are divided by the middle main grooves, the shoulder main grooves and the middle lateral grooves, and arranged at intervals in the tire circumferential direction, and
a pair of shoulder block rows of shoulder blocks which are divided by the shoulder main grooves, the tread edges and the shoulder lateral grooves, and arranged at intervals in the tire circumferential direction,
wherein
all of said plurality of center lateral grooves have the same groove width WA,
all of said plurality of middle lateral grooves have the same groove width WB,
all of said plurality of shoulder lateral grooves have the same groove width WC,
the groove width WA of the center lateral grooves is equal to the groove width WB of the middle lateral grooves, and
a ratio WC/WA of a groove width WC of the shoulder lateral grooves and the groove width WA of the center lateral grooves is 1.3 to 2.3,
wherein
the center main groove is disposed on the tire equator,
a groove width of each of the shoulder main grooves is larger than a groove width of the center main groove, and
a groove width of each of the middle main grooves is larger than the groove width of each of the shoulder main grooves, and
wherein the tread portion is provided with a directional pattern which is symmetrical about the tire equator except that one half of the pattern on one side of the tire equator is shifted in a circumferential direction from the other half of the pattern on the other side of the tire equator by half a pitch.

2. The pneumatic tire as set forth in claim 1, wherein the ratio WC/WA of the groove width WC of the shoulder lateral grooves and the groove width WA of the center lateral grooves is 1.6 to 2.0.

3. The pneumatic tire as set forth in claim 1, wherein
the groove width WA of the center lateral grooves,
the groove width WB of the middle lateral grooves, and
the groove width WC of the shoulder lateral grooves are not less than 4 mm.

4. The pneumatic tire as set forth in claim 1, wherein
a ratio Lc/Lm of a land ratio Lc of a center region which is a region between tire-circumferential-direction lines extending parallel with the tire circumferential direction, passing through both ends in the tire axial direction of the center blocks, and
a land ratio Lm of a middle area which is a region between tire-circumferential-direction lines extending parallel with the tire circumferential direction, passing through both ends in the tire axial direction of the middle blocks is 1.05 to 1.25.

5. The pneumatic tire as set forth in claim 1, wherein the angle with respect to the tire axial direction of the center lateral grooves is 10 degrees to 30 degrees.

6. The pneumatic tire as set forth in claim 1, wherein
the middle main grooves and the shoulder main grooves are formed zigzag,
the middle main grooves are intersected by the center lateral grooves and the middle lateral grooves at zigzag vertexes of the middle main grooves, and
the shoulder main grooves are intersected by the middle lateral grooves and the shoulder lateral grooves at zigzag vertexes of the shoulder main grooves.

7. The pneumatic tire as set forth in claim 1, wherein the tread portion is provided with a directional pattern for which a rotational direction is specified.

8. The pneumatic tire as set forth in claim 7, wherein
the center lateral groove is inclined to a later-contacting-side in the rotational direction from the inner end in the tire axial direction toward the outer end, and
the middle main groove is zigzag such that short segments and long segments are alternately arranged,
wherein
the short segments are inclined to the same direction as the center lateral grooves, and the long segments are longer in the circumferential length than the short segments and are inclined to the opposite direction to the short segments, and
the center lateral grooves are connected to the short segments of the middle main grooves.

9. The pneumatic tire as set forth in claim 8, wherein the center lateral groove has a tie bar raising from the groove bottom and connecting between the adjacent center blocks.

10. The pneumatic tire as set forth in claim 8, wherein
the middle lateral grooves are inclined to the same direction as the center lateral grooves,
the shoulder main groove has short segments inclined to the same direction as the middle lateral grooves, and long segments being longer in the circumferential length than the short segments and inclined to the opposite direction to the short segments, and
the middle lateral grooves are connected to the short segments of the shoulder main groove.

11. The pneumatic tire as set forth in claim 8, wherein
the center lateral grooves on both sides of the center main groove are arranged so that those on one side shift in the tire circumferential direction from those on the other side,
the center lateral grooves and the middle lateral grooves on both sides of the middle main groove are arranged so that those on one side shift in the tire circumferential direction from those on the other side, and
the middle lateral grooves and the shoulder lateral grooves on both sides of the shoulder main groove are arranged so that those on one side shift in the tire circumferential direction from those on the other side.

12. The pneumatic tire as set forth in claim 8, wherein
an angle $\gamma 1$ with respect to the tire circumferential direction of the center lateral grooves is smaller than an angle $\gamma 2$ with respect to the tire circumferential direction of the middle lateral grooves, and
the angle $\gamma 2$ with respect to the tire circumferential direction of the middle lateral grooves is smaller than an angle $\gamma 3$ with respect to the tire circumferential direction of the shoulder lateral grooves.

13. The pneumatic tire as set forth in claim 12, wherein
the angle $\gamma 1$ respect to the tire circumferential direction of the center lateral grooves is 60 degrees to 80 degrees, and
the angle $\gamma 3$ with respect to the tire circumferential direction of the shoulder lateral grooves is 80 degrees to 90 degrees.

14. The pneumatic tire as set forth in claim 1, wherein
the middle main grooves and the shoulder main grooves are formed zigzag,
the middle main grooves are intersected by the center lateral grooves and the middle lateral grooves at zigzag vertexes of the middle main grooves, and
the shoulder main grooves are intersected by the middle lateral grooves and the shoulder lateral grooves at zigzag vertexes of the shoulder main grooves.

* * * * *